Patented Mar. 26, 1935

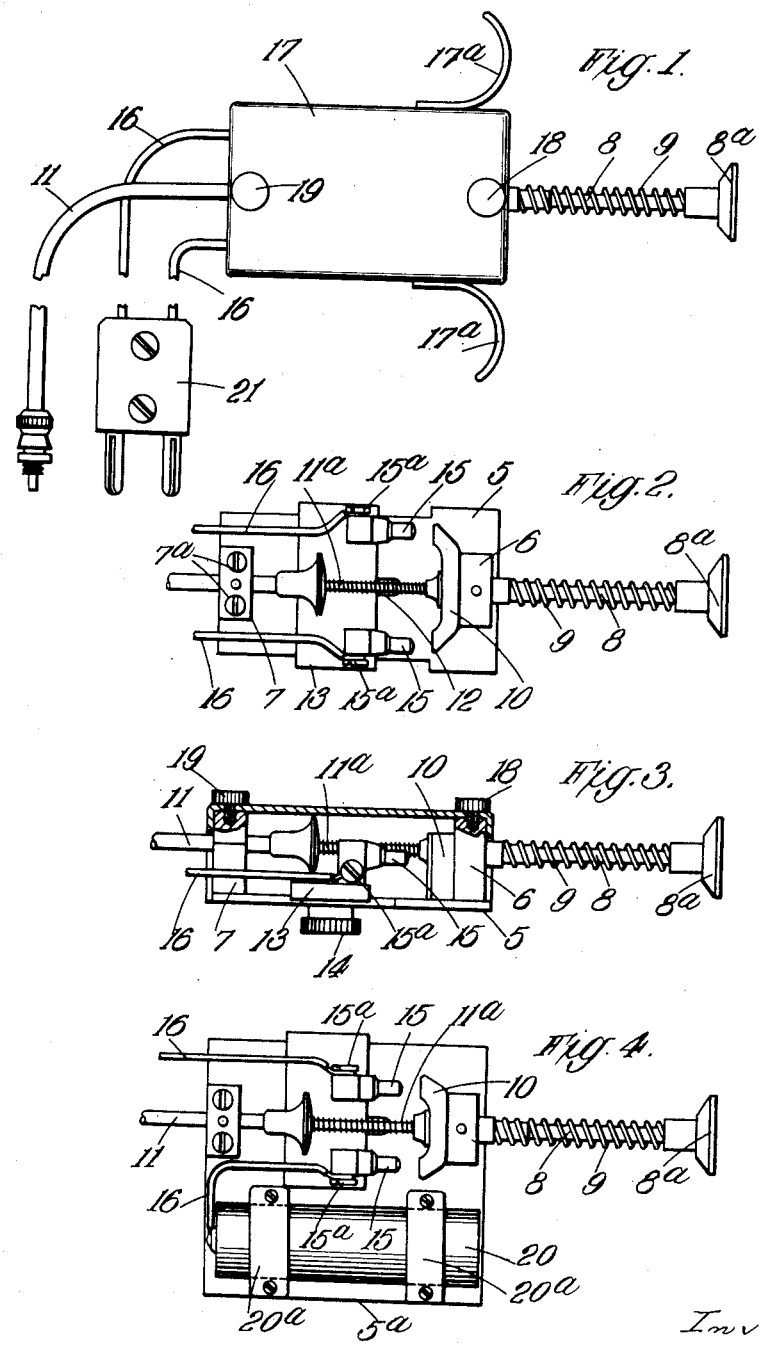

1,995,552

UNITED STATES PATENT OFFICE 1,995,552

PHOTOGRAPHIC FLASH-LIGHT APPARATUS

Alexander Stewart, London, England

Application December 9, 1930, Serial No. 501,129
In Great Britain November 13, 1930

4 Claims. (Cl. 67—29)

This invention relates to photographic flash-light apparatus and is concerned with a self-contained device which on operation releases the shutter of the camera and causes the flash for taking the photograph to be produced simultaneously.

With this and other objects in view the invention comprises an antinous or similar release for the shutter of a photographic camera and means so combined with the press portion of the release that an electric circuit is connected to operate a flash-light device when the release is actuated.

A rod or plunger is preferably provided for actuating the release and a member carried by the rod or plunger is adapted to be moved into contact with a pair of contacts upon actuation of the rod or plunger. The rod or plunger and the antinous release may be carried an a base plate upon which is also mounted a transverse member carrying the contacts, which latter have current leads connected thereto. This member is slidably mounted on the base plate by providing it with screw or other attachment means passing through an elongated slot in the base plate to allow adjustment of the contacts relatively to the member mounted on the rod or plunger.

In one embodiment of the invention an electric battery is associated with the means for connecting the electric circuit and is preferably electrically connected to one of the contacts mounted on the transverse member previously referred to. A casing of any suitable description may be provided, and when the device is adapted for hand operation, the casing is provided with a finger grip attachment.

Two embodiments of the invention will now be more particularly described with reference to the accompanying drawings wherein:—

Figure 1 is a plan view of the device showing the antinous release and electric leads and contact plug, Figure 2 is a view similar to Figure 1 with the casing removed, Figure 3 is a part sectional side view showing the means for adjusting the electric contacts and Figure 4 is a plan view of a modification.

Referring to Figures 1 to 3, a light rectangular metallic or other base plate 5 has provided thereon two upstanding apertured members 6 and 7, one at either end. These members 6 and 7 are preferably metallic pieces attached to the base plate 5 by screws. The member 6 forms a bearing for a rod or plunger 8 which is provided at its outer end with a knob or other operating means 8a. A helical spring 9 is mounted upon the rod 8 and abuts the knob 8a at one end and the apertured member 6 at the other. A metallic bridge 10 is attached, preferably by screw-threading, to the other end of the rod 8 and in the normal or inoperative position of the device the said metallic bridge 10 abuts or is near to the inner face of the apertured member 6 in which the rod 8 is slidable.

The apertured member 7 is formed in two parts, each having a semi-circular recess which constitutes a circular aperture in line, or substantially in line, with the aperture in the member 6, when the two parts of the member 7 are secured together by means of screws 7a or the like. The aperture in this member receives the end of the antinous release 11, the press portion 11a of which projects inwardly to take a bearing against the metallic bridge 10.

The rectangular base plate 6 of the device has a central, longitudinal elongated slot 12 therein which forms an adjustable mounting for a transverse member 13 of insulating material which is slidably attached to the base plate 5 by a screw 14, the threaded portion of the screw passing through the slot into a tapped recess in the insulating member and being of such a diameter that it slides freely within the slot 12 when the screw 14 is loosened. Moutned on the transverse insulating member 13 are two contacts 15, preferably spring-pressed, provided with terminals 15a having current leads 16 running therefrom to a plug 21 which may be inserted in a circuit connecting the flash-light device to a battery or other source of current. It will be understood that the two contacts 15, which are so disposed as to be engaged by the metallic bridge 10 when the rod 8 is pressed inwardly by means of its knob 8a, against the action of its spring 9 and also of the spring of the press portion 11a of the antinous release proper, are adjustable relatively to the bridge 10 so that an adjustment of the operative movement of the release 11 is obtainable whilst ensuring that an unfailing contact is obtained between the contacts 15 and the metallic bridge 10 which electrically connects them.

The contacts 15, bridge 10 and associated parts are enclosed in a metallic casing 17, Figure 1, which is provided with finger grips 17a. The casing 17 is attached to the members 6 and 7 by means of screws 18 and 19.

Figure 4 illustrates another embodiment of the invention, particularly intended for use when employing a flash-lamp such as is described in United States Patent No. 1,776,637 to Ostermeier, granted September 23, 1930. A small battery 20 is also mounted on the base plate 5a of the device by means of clips 20a and is electrically connected to the terminal 15a of one of the contacts 15, so that only one external flexible lead 16 is necessary, namely from the terminal 15a of the other contact 15 to the flash-lamp, which may be mounted on the camera as described in the specification of my co-pending United States patent application Serial No. 498,847, filed November 28, 1930.

Although the device has been described as being enclosed, whether in combination with an electric battery or not, in a housing of small dimensions and of any suitable shape, which housing may be provided with a finger grip or grips, the device may be adapted for foot operation in special circumstances.

It will be appreciated that the device may be used with any camera which may be operated by an antinous release and, moreover, as the device is self-contained and the release and electric leads may be of any desired length, the invention is especially applicable to apparatus for taking flash-light photographs when the camera has to be mounted in inaccessible positions, as for instance, suspended from the ceiling of a room or theatre.

It should be understood that various modifications in the arrangement and adaptation of the device of this invention may be made without departing from the essentials of the invention.

What I claim is:—

1. A flash-light switch for use in connection with an antinous release of a camera shutter, comprising a base plate having an elongated slot therein, means for attaching the stationary part of said antinous release to said base plate, a plunger adapted to operate upon the press portion of said antinous release, a transverse movable member slidably mounted on said base plate for movement in the direction of travel of said plunger, attachment means passing through said elongated slot to said transverse movable member for securing it in adjusted positions, contacts mounted upon said transverse movable member, means on said plunger for connecting said contacts to complete the flash-light circuit, and an electric battery mounted upon said base plate and serially connected by flexible conductors with the contacts on the movable member.

2. A flash-light switch for use in connection with an antinous release of a camera shutter comprising a base plate having an elongated slot therein, means for attaching the stationary part of said antinuous release to said base plate, a plunger adapted to operate upon the press portion of said antinous release, an insulated transverse movable member slidably mounted on said base plate for movement in the direction of travel of said plunger, attachment means passing through said elongated slot to said transverse movable member for securing it in adjusted positions, contacts mounted upon said transverse movable member, means on said plunger for connecting said contacts to complete the flash-light circuit, and an electric battery mounted upon said base plate and serially connected by flexible conductors with the contacts on the movable member.

3. A flash-light switch for use in connection with an antinous release of a camera shutter comprising a base plate having an elongated slot therein, a transverse movable member slidably mounted on said base plate, attachment means passing through said elongated slot to said transverse movable member, contacts mounted on said transverse movable member, a plunger adapted to operate upon the press portion of said antinous release, a bridge on said plunger for connecting said contacts to complete the flash-light circuit, a casing cooperating with said base plate, and a finger grip attachment on said casing.

4. A flash-light switch for use in connection with an antinous release of a camera shutter, comprising a base plate, a bearing block mounted on each end of the base plate, means for clamping the stationary part of an antinous release to one of said blocks, a plunger slidably mounted in the other block in axial alignment with the antinous release, a contact carrying member slidably mounted on said base plate and adjustable in the direction of movement of said plunger, a contact bridge carried on the inner end of the plunger adapted to engage the press portion of the antinous release to operate the latter on sliding movement of the plunger and to bridge the contacts on the sliding member.

ALEXANDER STEWART.